Figure 1:
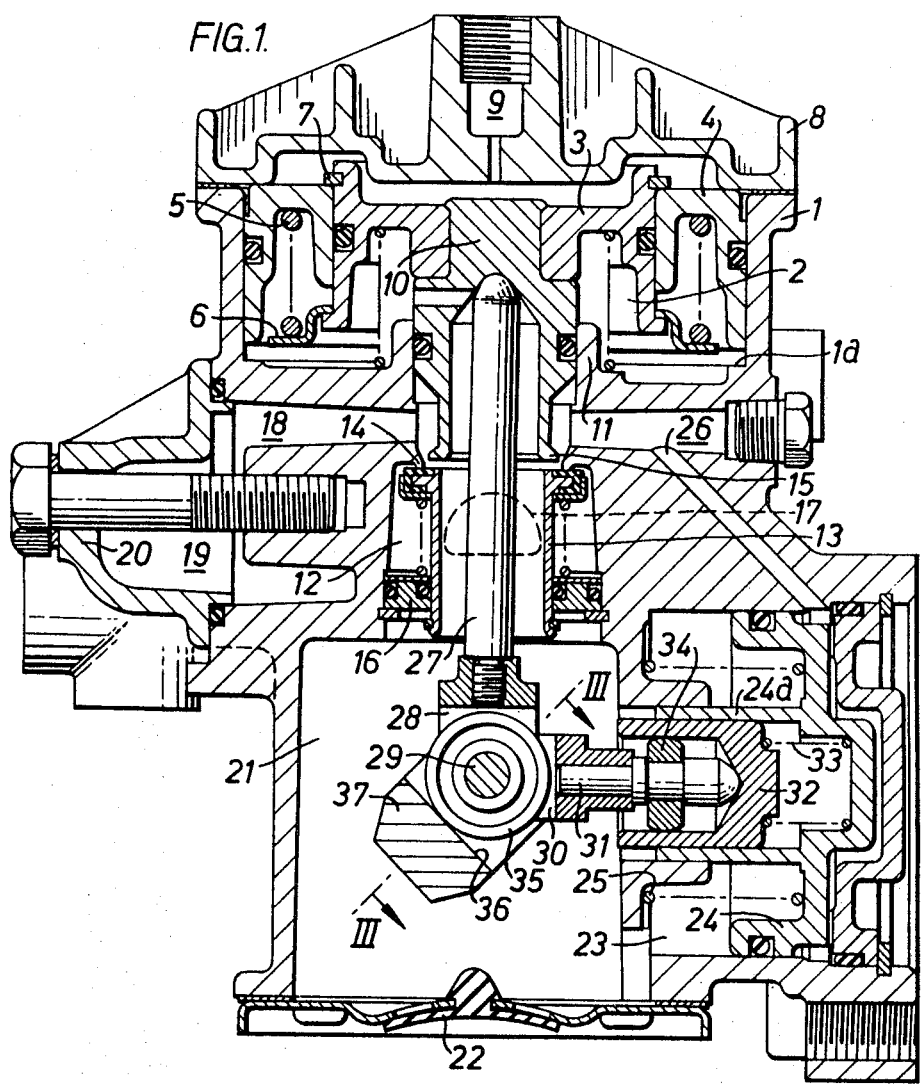

United States Patent

[11] 3,586,389

[72] Inventors Wilbur Mills Page
Bracebridge Heath, Lincoln;
Ralph Coupland, Lincoln, both of, England
[21] Appl. No. 793,763
[22] Filed Jan. 24, 1969
[45] Patented June 22, 1971
[73] Assignee Clayton Dewandre Company Limited
Lincoln, England
[32] Priority Jan. 29, 1968, May 16, 1968
[33] Great Britain
[31] 4489/68 and 23374/68

[54] APPORTIONING VALVES FOR BRAKING SYSTEMS
13 Claims, 7 Drawing Figs.
[52] U.S. Cl. .................................... 303/22,
303/40, 303/54
[51] Int. Cl. ...................................... B60t 8/18,
B60t 15/00
[50] Field of Search ............................ 303/22, 22
A, 6, 40, 54

[56] References Cited
UNITED STATES PATENTS
| | | | |
|---|---|---|---|
| 3,109,681 | 11/1963 | Wilson | 303/22 |
| 3,186,771 | 6/1965 | Alfieri | 303/22 |
| 3,269,782 | 8/1966 | Jolly | 303/22 X |
| 3,404,922 | 10/1968 | Valentine | 303/22 X |

*Primary Examiner*—Milton Buchler
*Assistant Examiner*—John J. McLaughlin
*Attorney*—Norris & Bateman

ABSTRACT: An apportioning valve for use in an air pressure braking system, comprises piston means responsive to brake line or signal pressure, valve means actuated directly by the piston means and controlling airflow to the brake actuators, and a reaction piston responsive to the generated braking pressure and acting on the valve means in opposition to the piston means, said reaction piston acting through a member riding on an inclined plane the angle of which varies with vehicle load thereby varying the degree of reaction for a given braking effort.

INVENTORS
WILBUR MILLS PAGE
RALPH COUPLAND

By Norris & Bateman

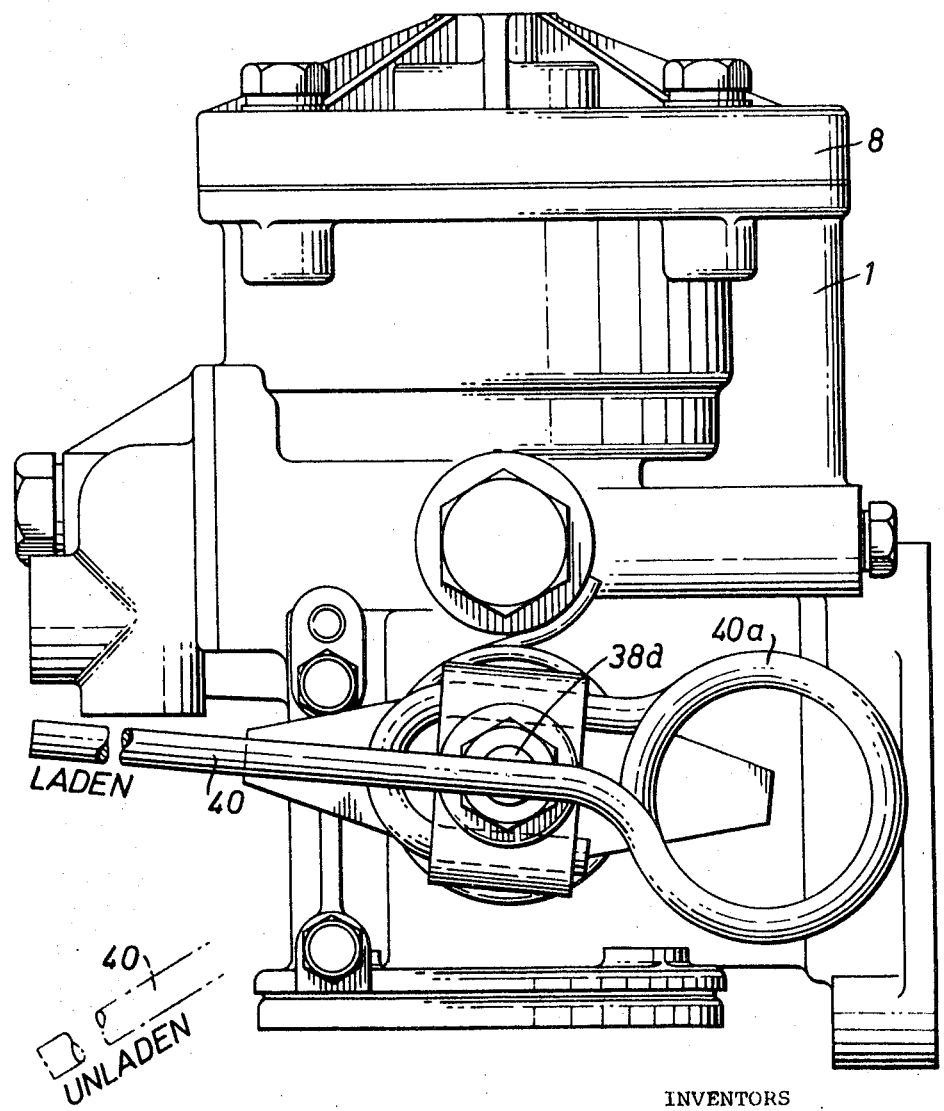

INVENTORS
WILBUR MILLS PAGE
RALPH COUPLAND

BY Norris & Bateman

INVENTORS
WILBUR MILLS PAGE
RALPH COUPLAND

By Norris & Bateman

APPORTIONING VALVES FOR BRAKING SYSTEMS

This invention relates to air pressure braking systems for motor vehicles and particularly to apportioning valves as used therein for regulating the braking pressure in accordance with vehicle load, the main object of the invention being the provision of an improved valve for this purpose which "cracks" at a constant effort and which is more consistent and positive in operation.

It is also an object of the invention to provide a relay emergency valve in association with the improved apportioning valve in a manner such as to simplify installation and operation of the braking system.

According to the invention there is provided an apportioning valve comprising basically means displaceable by signal pressure and arranged to actuate directly valve means controlling flow of pressure air to the brake actuators, and pressure-sensitive reaction means responsive to the active braking pressure and acting in opposition to the displaceable means, said reaction means exerting its force through a member moveable along an inclined plane the angle of which is variable in accordance with vehicle load.

Where the improved apportioning valve is incorporated in a dual line braking system of a tractor/trailer vehicle, the valve may be used in conjunction with a relay emergency valve either forming a unit with the apportioning valve or mounted separately upon or in association with the trailer reservoir, and these and other features of the invention will be more fully described hereafter.

Figure 3:
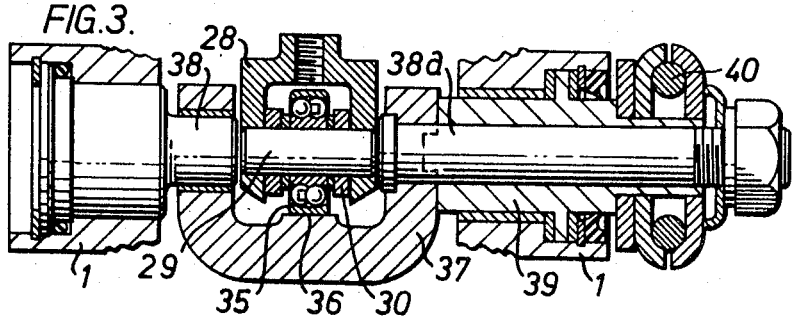
Figure 4:
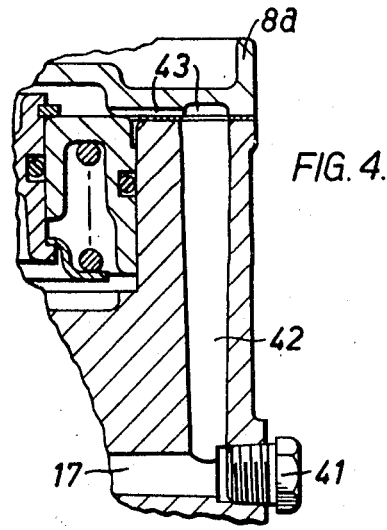
Figure 7:
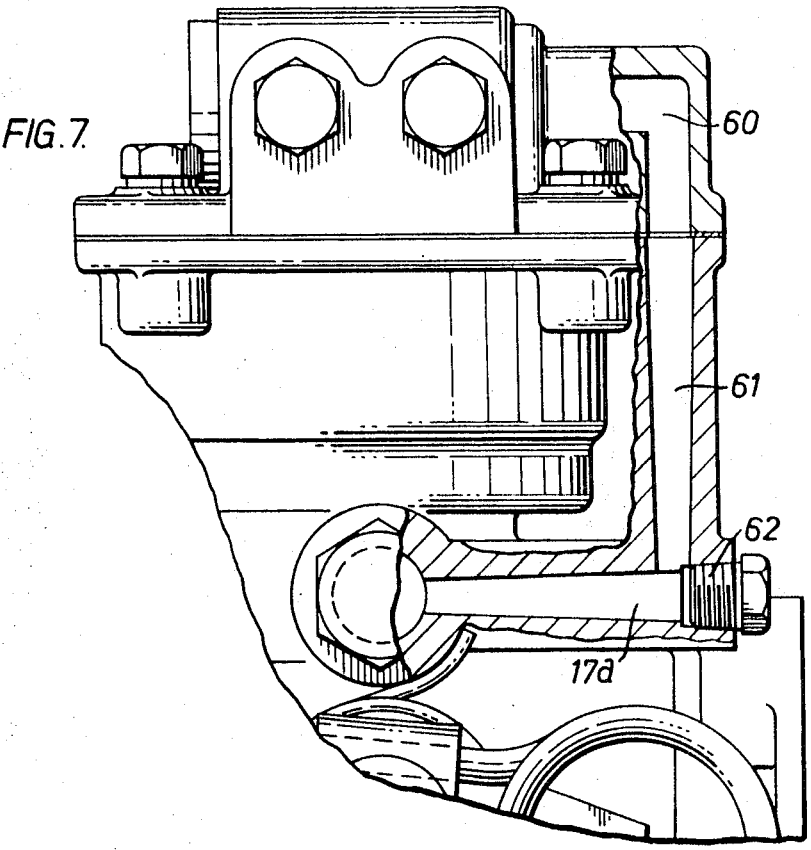
Figure 5:
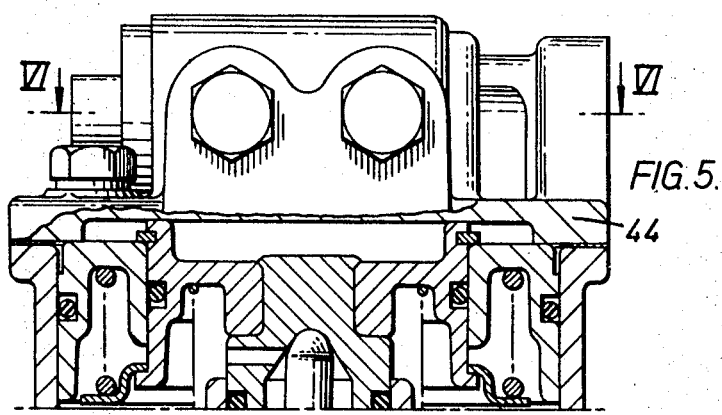
Figure 6:
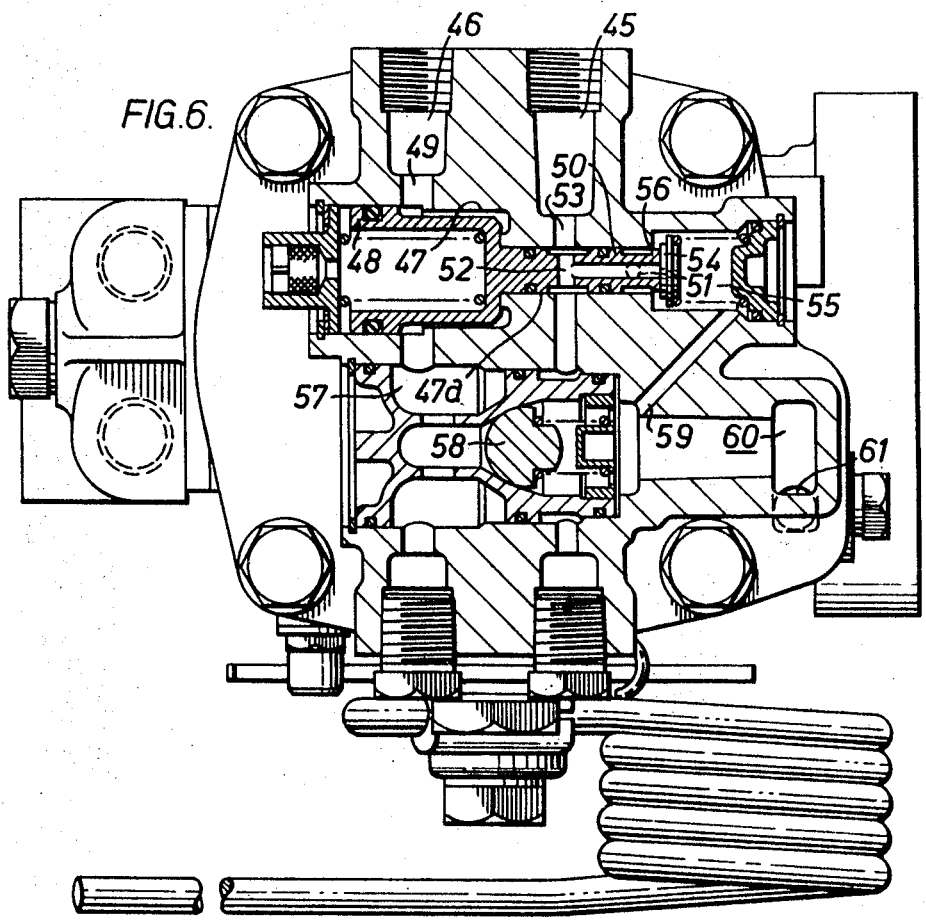

Reference will now be made to the accompanying drawings which illustrate several embodiments of the invention and wherein:

FIG. 1 is an axial sectional view of the improved valve in a form in which it operates as a relay valve in a single line system, FIG. 2 is a side elevation of the valve of FIG. 1, FIG. 3 is a fragmentary sectional view taken on the line III-III of FIG. 1, FIG. 4 is a fragmentary sectional view showing the manner in which the valve of FIG. 1 is modified to operate as a direct-acting or nonrelay-type valve, FIG. 5 is a fragmentary sectional view corresponding to the upper part of FIG. 1 but showing the manner in which a relay emergency valve unit is substituted for the valve cover of the apportioning valve, FIG. 6 is a sectional plan view taken on the line VI-VI of FIG. 5, and FIG. 7 is a detail sectional view showing passage connections.

Referring first to FIGS. 1-3, the valve shown comprises a body or housing 1 defining in its upper part a vertical chamber 2 in which is located a displaceable input piston assembly consisting of concentric inner and outer pistons 3, 4 respectively. The outer piston is supported for limited axial movement upon the inner piston and a compression spring 5 is interposed between said outer position and a keeper 6 on the inner piston to urge the outer piston relative to the inner piston and into abutment with a stop 7 thereon. The outer piston 4 also has sealed sliding engagement with the wall of the chamber 2 and said chamber is closed at its upper side by a valve cover 8 provided with an input port 9 adapted in use to be connected to the brake control line. The inner piston 3 is fast with a hollow stem structure 10 sliding within a tubular valve guide 11 formed integrally with the housing 1, the bore of said valve guide opening at its lower end into a valve chamber 12 within which is disposed a hollow spring-loaded poppet valve 13, the head of this valve being preferably rubber covered and cooperating with a fixed annular seating 14 at the junction of chamber 12 and the bore of valve guide 11 and with a further seating 15 formed on the lower end of stem structure 10. The chamber 12 is closed towards its lower end by a partition 16 and, above the partition is connected by a passage 17 to a port which, in use, is connected to a reservoir or like pressure air source, whilst the lower end of the bore of the valve guide is connected by a passage 18 to a port 19 which in use receives a manifold 20 embodying appropriate means establishing parallel connections to the brake actuators. The bore of the hollow poppet valve 13 opens at its lower end into an enlarged chamber 21 permanently connected to atmosphere through a check valve 22.

Formed in the lower part of the housing alongside the chamber 21 is a reaction chamber 23 within which is disposed a horizontally sliding reaction piston 24, said piston being urged outwardly by a loading spring 25 and the outer end of chamber 23 being connected by passageways 26 and the bore of the valve guide 11 to the port connections to the brake actuators. A thrust-transmitting connection is provided between the inner input piston 3 and the reaction piston 24, said connection consisting of associated piston rods pivotally interconnected at their ends remote from the pistons. More particularly and as shown, a piston rod 27 received at its upper end in an axial socket in the stem structure 10 carries on its lower end a fork 28 supporting a spindle 29 on which is mounted a roller 35 riding on an inclined surface 36, said spindle also being embraced by a second fork 30 on the inner end of a push rod 31. The outer end of the push rod 31 is received within and abuts a hollow piston guide 32 sliding in a tubular axial extension 24a of the reaction piston, a light spring 33 being interposed between the piston guide and the reaction piston and serving normally to maintain these components in spaced relation as shown. This arrangement ensures that the push rod 31 and roller 35 are kept in operative engagement at all times and also provides frictionless reaction to initial "crack-off" loads. A rubber disc 34 embracing push rod 31 has a loose fit in the piston guide 32 and serves to locate the push rod axially of the guide.

The inclined surface 36 is formed on a yoke-shaped member 37 which is oscillatably supported in the housing 1 by trunnions 38, 38a, the arrangement being such that the degree of reaction transmitted to the piston assembly 3, 4 for a given movement of the reaction piston varies with the angle of inclination of the surface 36. The yoke 37 is displaced angularly in accordance with vehicle load, and in the construction illustrated the trunnion 38a extends within a sleeve 39 which is fast with the yoke 37 and which, externally of the housing, is provided with an actuating lever assembly. In use, the valve housing 1 is secured to the vehicle frame and said lever assembly connected to a wheel axle such that the angular disposition of the yoke 37 is dependent upon the riding height of the vehicle frame. The actuating lever assembly shown consists of a torsion spring arm 40 clamped at one end to the sleeve 39 and provided with one or more coils or turns 40a intermediate its ends, whilst its free end is connected to the wheel axle by means not shown. In a specific embodiment with the arrangement illustrated, the lever arm 40 occupies the position shown in full lines in FIG. 2 when the vehicle is fully laden and in this condition the full available pressure is transmitted to the brake actuators. As vehicle load is reduced the lever arm moves downwards or anticlockwise relative to the housing as viewed in FIG. 2, thereby modifying the degree of reaction, and in the unladen condition, indicated in broken lines, the maximum pressure transmitted to the brake actuators may for example be 25 percent of brake line pressure. The torsion spring arm absorbs the rapid oscillations caused by road wheel travel over uneven surfaces whilst transmitting to the apportioning valve any relative displacement of axle and vehicle frame created by change of load. Alternatively, where operating requirements are satisfied any equivalent means may be used as, for example, an articulated lever arm embodying a spring-loaded knuckle joint, or a plain rigid operating lever arm.

The valve operates in the following manner:

Under normal running conditions, the poppet valve 13 engages the seating 14 whilst the seating 15 is spaced from said valve whereby the brake actuators are connected to exhaust through passage 18, the bore of the poppet valve and chamber 21. To apply the brakes, a signal input from the brake valve is introduced through the port 9 to the upper end of chamber 2, thereby displacing the piston assembly 3, 4 downwards, first closing off the exhaust connection at valve seating 15 and then displacing the poppet valve from seating 14 to connect the brake actuators to the compressed air supply via passage 17. The downward movement of the input piston assembly is transmitted through the interconnected piston and push rods 24, 31 to the reaction piston 24 but the pressure created in passage 18 is also transmitted through passages 26 to the outer face of the reaction piston opposing movement thereof. In practice, the reaction piston will restore the poppet valve to a lap position when a predetermined pressure has been established in the brake actuators, the degree of reaction and thereby the braking pressure created for a given braking effort being dependent upon the inclination of the yoke member and thus upon vehicle load.

Although reference is made above to initial downward movement of the input piston assembly, the two pistons do not move in unison at all times. When the dual piston assembly has moved sufficient to seat the exhaust valve and open the poppet valve and just after valve "crack-off," the downward force on the outer piston 4 due to the initial air pressure will equal the force of opposing spring 5 and move the piston downwards to a stop 1a on the housing. The provision of the additional or outer piston therefore gives an improved low valve "crack-off." However, the reaction force of the spring 5 is still applied to inner piston 3 thus opposing the initial reactive force from air pressure acting on the reaction piston. This feature will delay apportioned reaction pressure until such time as initial delivery pressure has closed the brakeshoes up to the drums.

The above-described valve may operate alone as a direct acting valve in a single line system and for this purpose the arrangement shown in FIG. 4 is adopted. In this instance, the passage 17 by which an air supply is connected to the valve chamber 16 is closed off at its outer end, as by a plug 41, and instead, it communicates by way of a vertical drilling 42 in the housing and peripheral and radial grooves 43 in the valve cover 8a with the interior of said cover. Thus, when the input port in the valve cover is connected into the brake line and the brake valve is actuated to apply the brakes, the compressed air admitted to the valve cover will first displace the input piston assembly in the manner previously described and, when the poppet valve is moved off seating 14, then flow through passages 42, 17, 18 to the brake actuators. The operation is otherwise as described with reference to FIGS. 1—3.

Thus, the invention provides an improved apportioning valve in which valve travel remains the same irrespective of the angle of the yoke member, whilst at the same time, also providing a valve construction which is economical to produce by reason of simplicity of assembly and the minimum of close tolerances.

Where the apportioning valve is used in the trailer section of a tractor-trailer air pressure braking system of the dual line type and including a relay emergency valve for effecting application of the trailer brakes in the event of a "break-away" or other conduit failure, the relay emergency valve may be superimposed directly upon the apportioning valve in place of the valve cover. As shown in FIGS. 5 and 6, the relay emergency valve in this instance comprises a housing 44 preferably having a machined lower face to seat tightly upon the upper end face of the apportioning valve housing 1, the relay emergency valve including a service port 45 for connection to the brake control line and an emergency port 46 for connection with the tractor reservoir. Formed within the emergency valve housing is a stepped bore, the larger chamber 47 of which receives a spring-loaded piston 48 and, beyond the piston, is permanently connected by a passage 49 to the emergency port 46, the piston having a hollow stem 50 sliding in the narrower portion 47a of the bore which is connected by a further passage 51 terminating at the lower face of the housing 44 above the chamber 2 in the apportioning valve housing.

The bore in the piston stem 50 is connected by a cross passage 52 and a further passage 53 in housing 44 with the service port 45, the open end of the stem coacting with a spring-loaded disc valve 54 located in a counterbore 55. The disc valve also coacts with an annular seating 56 separating the counterbore chamber from the reduced bore portion 47a. The passage 49 is extended beyond chamber 47 to a parallel chamber 57 the outlet from which is controlled by a nonreturn valve 58. From said outlet a passage 59 leads to the counterbore 55 and further passage means 60 terminate at the lower face of the housing. At this point passage 60 communicates with a vertical passage 61 in valve housing 1 leading to a port 62 connected to the trailer reservoir and by passage 17a to the chamber 12 of the apportioning valve, see FIG. 7. The valve assembly operates as follows:

When the two-line system is first established between tractor and trailer, air from the tractor reservoir will flow through the emergency line to the relay valve and past the nonreturn valve to the trailer reservoir to charge the latter. When a predetermined pressure has been established, air from the emergency line will also displace the piston 48 in the relay valve whereby the free end of the piston stem 50 is withdrawn from the disc valve 54 which remains on the annular seating 56 and connection is established through the hollow valve stem between the service port 45 and the passage 51 leading down into the apportioning valve. Thus, when a braking pressure is established in the service or brake control line, it actuates the apportioning valve in the manner previously described. If, however, due to a "break-away" or other cause the conduit connections to the apportioning and emergency valve assembly are ruptured, the nonreturn valve 58 preserves the charge in the trailer reservoir, whilst the loss of pressure behind the piston 48 results in the piston moving in the direction to cause the hollow stem 50 to engage the disc valve 54 and moves it off its seating 56. In this manner, the passage means 60, 61 connected to the trailer reservoir is placed in communication with the passage 51 leading to the upper chamber 2 in the apportioning valve and thus the valve is actuated to apply the trailer brakes.

An important feature of this construction is that the valve operation when going into "emergency," i.e., when the emergency line pressure falls to a predetermined value, e.g., 45/50 p.s.i. due to rupture of the pipe by any cause, is the same as normal operation when triggered by the service line during a routine braking application. In other words, the braking chambers receive a charge of air and provide a braking effort proportional to the load on the trailer.

In a modification of the above-described arrangement the relay emergency valve is situated remotely from the apportioning valve, e.g., upon or adjacent the trailer reservoir, and has appropriate conduit connections into the system. The relay valve is similar in construction to that above described comprising basically the stepped bore with the spring-loaded piston responsive to emergency line pressure, and the spring-loaded disc valve cooperating with the hollow stem of the piston to control flow between the service line, the trailer reservoir and the vertical chamber of the apportioning valve, additional ports being provided as required to receive the necessary conduit means by which the valve connects the service and emergency lines from the tractor to the trailer reservoir and to the apportioning valve.

We claim:

1. An apportioning valve assembly for use in a fluid pressure braking system for a motor vehicle, comprising valve means controlling flow of fluid under pressure to brake actuator means in said system and having a movably mounted member, displaceable fluid pressure responsive means mounted in operative association with said valve means and having direct engagement with said valve member, means for applying an actuating signal pressure directly to said pressure responsive means to displace said fluid pressure responsive means in a predetermined direction for positively moving said valve member in the same direction to actuate said valve means to admit operative fluid pressure to said brake actuator means, and fluid pressure sensitive reaction means mounted in spaced relation to said valve means for movement independently of said valve member connected to be responsive to said operative braking pressure and having a motion transmitting connection to said displaceable fluid pressure responsive means, said motion transmitting connection comprising means defining an inclined plane surface adapted to be varied in accord with load on the vehicle and a member movable along said inclined surface and operatively connected between said reaction means and said displaceable fluid pressure responsive means.

2. An apportioning valve assembly as claimed in claim 1, wherein said displaceable fluid pressure responsive means comprises piston means operable to engage and displace a valve element from its seating thereby to connect a port leading to the brake actuators selectively to exhaust or to a source of pressure air, and wherein said reaction means also consists of piston means which is movable in a cylinder in communication with the brake actuator connected port, the two piston means being movable in directions at right angles one to the other, and a thrust-transmitting connection between said piston means consisting of two piston rods which support at their point of interconnection a roller riding on said inclined surface.

3. An apportioning valve assembly as claimed in claim 2, wherein the inclined surface is provided on a yoke-shaped member supported for oscillatory movement in the housing of the valve and provided externally of the housing with an operating lever by which the yoke is angularly displaced in accordance with variations in distance between a road wheel axle and the vehicle frame.

4. A valve assembly as defined in claim 1 wherein said valve means is resiliently biased to normally close a passage conducting fluid under pressure to said actuator means, and said displaceable fluid pressure responsive means comprises piston means exposed at one side to said signal pressure and adapted at the other side to engage and move said valve member to open said passage.

5. A valve assembly as defined in claim 4, wherein said valve member comprises a hollow element which is resiliently seated in valve closed position to block said passage against transmission of fluid pressure to said actuator means and to connect said actuator means through said passage to exhaust in the absence of signal pressure acting on said piston, and which is unseated by said piston to provide for transmission of fluid pressure through said passage to the actuator means, said piston closing said hollow element to block connection between said actuator means and exhaust when said hollow element has been unseated by the piston.

6. A valve assembly as defined in claim 5, said piston having a hollow stem coaxial with and adapted to engage said hollow valve element.

7. A valve assembly as defined in claim 6, said motion transmitting connection comprising a rod extending through said hollow valve element and the piston stem to engage said piston.

8. A valve assembly as defined in claim 1, wherein said displaceable fluid pressure responsive means comprises slidably connected inner and outer pistons both exposed to said signal pressure and oppositely biased by compression spring means disposed between them, and means for limiting displacement of the outer piston after predetermined travel while permitting continued spring opposed movement of the inner piston in the valve means actuation direction.

9. A valve assembly as defined in claim 1, wherein said valve assembly is disposed in a housing having passage means for applying fluid at operative brake line pressure to said pressure responsive means, where it functions as said signal pressure, and to said brake actuator means when said valve means has been opened, whereby said valve assembly acts as a direct-acting single line valve.

10. A valve assembly as defined in claim 1, wherein said valve assembly is disposed in a housing and said signal pressure in introduced to a side of said displaceable fluid pressure responsive means through a first inlet port, and a second inlet port adapted to be connected to a source of operative brake line pressure separate from said signal pressure is connected through housing passage means with a valve chamber from which operative fluid pressure is delivered to said brake actuators under control of said valve means.

11. An apportioning valve assembly for use in an air pressure braking system for motor vehicles, comprising means displaceable by signal pressure and arranged to actuate directly valve means controlling flow of pressure air to the brake actuators said displaceable means comprising a first piston means operable to directly engage and displace a spring-biased valve element from its seating thereby to control connection of a port leading to the brake actuators selectively to exhaust or to a source of braking air pressure, and pressure sensitive reaction means mounted for movement independently of said valve element and being responsive to the active braking air pressure and acting in opposition to said displaceable means, said reaction means exerting its force through a member movable along an inclined plane surface the angle of which is adapted to be varied in accord with vehicle load and comprising a second piston means which is movable in a cylinder in communication with said brake actuator connected port, said two piston means being movable in directions at right angles one to the other and there being a thrust-transmitting connection between said piston means comprising two interconnected piston rods that support at their point of interconnection a roller riding on said inclined surface.

12. An apportioning valve assembly as claimed in claim 11, wherein said signal pressure actuated piston means comprises inner and outer concentric pistons, the inner piston having a stem structure by which it actuates said valve element and by which it has said thrust-transmitting connection with the reaction piston means, while the outer piston is supported for limited axial movement upon the inner piston and is spring loaded, said two pistons initially moving in unison in response to signal pressure to provide a low valve "crack-off" and there being means provided to arrest the outer piston after predetermined movement so that thereafter the inner piston moves alone under signal pressure while both pistons continue to oppose the reactive force from the reaction piston.

13. An apportioning valve assembly as claimed in claim 11, wherein said reaction piston means has a tubular axial extension within which slides a hollow piston guide, the associated piston rod of said thrust-transmitting connection having operative engagement with the piston guide which is normally held in spaced relation to the reaction piston means by a light spring.